(12) United States Patent
Suzuki et al.

(10) Patent No.: US 6,673,269 B2
(45) Date of Patent: Jan. 6, 2004

(54) PHOSPHOR MATERIAL AND ITS METHOD OF MANUFACTURE

(75) Inventors: Tomokazu Suzuki, Anan (JP); Takuya Hamada, Mobara (JP); Kazunori Kitagawa, Mobara (JP); Hitoshi Toki, Mobara (JP)

(73) Assignees: Nichia Corporation, Tokushima (JP); Futaba Corporation, Chiba (JP)

( * ) Notice: Subject to any disclaimer, the term of this patent is extended or adjusted under 35 U.S.C. 154(b) by 51 days.

(21) Appl. No.: 10/059,195

(22) Filed: Jan. 31, 2002

(65) Prior Publication Data

US 2002/0175314 A1 Nov. 28, 2002

(30) Foreign Application Priority Data

Feb. 2, 2001 (JP) ......... 2001-027552
Feb. 6, 2001 (JP) ......... 2001-030245
Feb. 6, 2001 (JP) ......... 2001-030246

(51) Int. Cl.$^7$ ............ C09K 11/67; C09K 11/55
(52) U.S. Cl. ............ 252/301.4 F
(58) Field of Search ............ 252/301.4 F

(56) References Cited

U.S. PATENT DOCUMENTS 3,557,014 A * 1/1971 Beals et al. ......... 252/301.4 F
5,619,098 A    4/1997 Toki et al.

FOREIGN PATENT DOCUMENTS

JP    8-85788     4/1996
JP    10-273658   10/1998

* cited by examiner

Primary Examiner—C. Melissa Koslow
(74) Attorney, Agent, or Firm—Wenderoth, Lind & Ponack, L.L.P.

(57) ABSTRACT

A phosphor material of the chemical composition formula $(Sr_{1-x-y}, Mg_x, Ca_y)TiO_3$:Pr,Al, where the value of x+y is in the range 0.001 to 0.05. Another phosphor material has the chemical composition formula $SrTiO_3$:Pr,Al, in which the surfaces of phosphor particles are diffused with a diffusing agent containing at least one of Be, Mg, Ca, Sr, and Ba. Still another phosphor material has the chemical composition formula $SrTiO_3$:Pr,Al, where Sr/Ti molar ratio is 0.88 to 0.99.

27 Claims, 3 Drawing Sheets

PHOSPHOR MATERIAL AND ITS METHOD OF MANUFACTURE

This application is based on Application No. 027552 filed in Japan on Feb 2, 2001, Application No. 030245 filed in Japan on Feb 6, 2001, and Application No. 030246 filed in Japan on Feb. 6, 2001, the contents of which are incorporated hereunto by reference.

BACKGROUND OF THE INVENTION

This invention relates to phosphor materials primarily excited by electron beams accelerated by 1000 V or less, described by the chemical composition formula $SrTiO_3$:Pr, Al, and to the method of manufacture of those phosphor materials.

Formerly, ZnS:Ag phosphor materials, with zinc sulfide as the primary phosphor component, were used in cathode ray tubes (CRTs) as blue phosphors which emitted light when excited by low accelerating voltage electron beams. However, these sulfide phosphors emit sulfide gasses when excited by an electron beam and the phosphor material dissociates and scatters. As a result, problems with oxide filament contamination and reduction in phosphor light emitting efficiency easily develop. Further, these phosphors also have the drawback that red light cannot be emitted.

(ZnCd)S:AgCl phosphor materials have been developed as phosphors which emit light in the red to yellow range with low accelerating voltage electron beams. However, these phosphors not only include cadmium, which can cause environmental contamination, but they also have undesirable light emission characteristics due to poor conductivity. Poor conductivity yields non-uniform light emission and reduced luminance. This is because electrons supplied for excitation cannot flow smoothly and the phosphor becomes negatively charged by the electrons. Specifically, the phosphor becomes charged-up and the negative charge becomes an obstacle to the flow of electrons in the electron beam. In particular, a low accelerating voltage electron beam cannot be smoothly supplied to a negatively charged phosphor, and this causes significant light emission characteristic degradation. To eliminate this drawback, a powder such as $In_2O_3$ is mixed into (ZnCd)S:AgCl phosphor to improve conductivity. This phosphor has improved conductivity due to the added powder, but since the conductivity of the phosphor itself is not improved, ineffective current through the conducting powder becomes large. This situation is the cause of reduced light emitting efficiency particularly for low accelerating voltage electron beams.

Phosphor materials with $SrTiO_3$ as their primary component have been developed which do not include cadmium, are applicable with low accelerating voltage electron beams, and emit red light (Japanese Patent Publication HEI 8-85788, 1996). These phosphors have the feature that they do not include the environmental contaminant cadmium, but they do not have desirable light emission characteristics. In particular, they do not have sufficiently long life time. With the objective of eliminating this drawback, phosphors which replace part of the Ti with group IVB elements such as Sn, Si, and Ge have been developed (Japanese Patent Publication HEI 10-273658, 1998). Lifetime characteristics of the $SrTiO_3$:Pr, Al phosphor materials cited in this disclosure can be improved by increasing the amount of Sn added. However, as the amount of added Sn increases, reduction in luminance is a drawback.

The present invention was developed to further resolve these drawbacks. Thus it is the first object of the present invention to provide electron beam excited, light emitting $SrTiO_3$:Pr, Al type phosphor material which can be improved in both luminance and life time characteristics, and to provide its method of manufacture.

The present invention was developed to improve non-uniform light emission caused by lower conductivity associated with phosphors having $SrTiO_3$ as a primary component. Thus it is the second object of the present invention to provide phosphor material which can effectively eliminate light emission non-uniformity with low accelerating voltage electron beams.

SUMMARY OF THE INVENTION

The first electron beam excited, light emitting phosphor material of the present invention has the chemical composition formula $(Sr_{1-x-y}, Mg_x, Ca_y)TiO_3$:Pr,Al, where x+y is specified in the range 0.001 to 0.05. If x+y is less than 0.001, luminance improvement effects become insufficient and effects allowing lifetime improvement become small. In contrast, if x+y is made greater than 0.05, luminance drops abruptly. Consequently, considering both luminance and lifetime, x+y is limited to the extremely small range specified above for the phosphor of the present invention.

The phosphor of the present invention has the value of x+y specified within the range described above and with the possibility of x=0 or y=0. A phosphor with x=0 has part of the Sr replaced by Ca only, and a phosphor with y=0 has part of the Sr replaced by Mg only.

The value of x+y in the formula $(Sr_{1-x-y}, Mg_x, Ca_y)TiO_3$:Pr,Al is specified within the range described above for the phosphor of the present invention, and as shown in FIG. 1, lifetime characteristics can be greatly improved while improving luminance characteristics by replacing part of the Sr with trace amounts of Mg and Ca. Further, lifetime characteristics can be greatly improved while improving luminance characteristics by replacing part of the Sr with only Ca for x=0, or by replacing part of the Sr with only Mg for y=0.

The value of x+y in the chemical formula is preferably in the range from 0.003 to 0.02, and this allows marked improvement in lifetime characteristics while further improving luminance characteristics. The phosphor material of the present invention is suitable for phosphor displays with electron beam accelerating voltages of 1000 V or less, or as phosphors used in displays having field emission cathodes as sources of electrons.

The amount of the activating element Pr included is preferably from 0.0001 to 0.1 mole per mole of Sr, and the amount of Al included is preferably from 0.001 to 1.0 mole per mole of Ti. Further, part of the activating element Al may also be replaced by at least one of the elements, Ga and In.

The first phosphor of the present invention has the chemical formula $(Sr_{1-x-y}, Mg_x, Ca_y)TiO_3$:Pr,Al, where x+y is specified in the range 0.001 to 0.05, and by replacing part of the Sr with Mg and Ca, has the feature that lifetime characteristics can be greatly improved while improving luminance characteristics.

The second electron beam excited, light emitting phosphor material of the present invention has the chemical composition formula $SrTiO_3$:Pr,Al, and the surface of phosphor particles are diffused with a diffusing agent containing at least one type of the following elements; Be, Mg, Ca, Sr, and Ba. $SrTiO_3$:Pr,Al phosphors emit red light when excited by low energy electron beam, but the impact energy of a low energy electron beam is small and light emission is from the surface of phosphor particles. By diffusing a diffusing agent containing at least one type of the elements, Be, Mg, Ca, Sr, and Ba, into the surface region of phosphor particles of the present invention, light emission characteristics of the surface of phosphor particles are improved. Consequently, low accelerating voltage, low energy electron beam light emission characteristics of the $SrTiO_3$:Pr,Al phosphor material of the present invention can be improved.

The diffusion depth of the diffusing agent into the phosphor particle interior is preferably in the range of 50 Å to 400 Å from the surface. Diffusion depth of the diffusing agent into the phosphor particle can be adjusted by firing time and temperature during the re-firing process. If firing time and temperature during the re-firing process are increased, the diffusing agent will diffuse deeper into the phosphor particle. Diffusion depth is set from 50 Å to 400 Å because light emission characteristics under low accelerating voltage, low energy electron beam excitation decrease when diffusing agent diffusion depth exceeds 500 Å. Consequently, the diffusion depth of the diffusing agent into the surface region of the phosphor particle is preferably less than 400 Å. Therefore, since this phosphor material has diffusing agent diffused within a range from the surface to 400 Å, light emission characteristics can be improved when excitation is by low energy electron beam.

Phosphor particles are re-fired with diffusing agent in contact with particle surfaces for diffusion into phosphor particle surface regions. Phosphor material re-fired to diffuse diffusing agent into surface regions is preferably made to include 0.001 to 15 weight % diffusing agent. Firing temperature in the re-firing process is 400° C. to 1300° C. Phosphor material re-fired at this temperature has diffusing agent diffused and incorporated into phosphor particle surface regions.

The second, $SrTiO_3$:Pr,Al, phosphor material of the present invention is preferably made by re-firing at 400° C. to 1300° C. $SrTiO_3$:Pr,Al phosphor material re-fired at this temperature, with diffusing agent covering or attached to phosphor particle surfaces during re-firing, has diffusing agent diffused from the phosphor particle crystalline surface towards the particle interior.

The second, $SrTiO_3$:Pr,Al, phosphor material of the present invention is suitable for phosphor displays with electron beam accelerating voltages of 1000 V or less, or as phosphors used in displays having field emission cathodes as sources of electrons.

The method of manufacture of the second phosphor material of the present invention comprises a first firing process to fire raw materials to form $SrTiO_3$:Pr,Al phosphor, and a re-firing process to again fire the $SrTiO_3$:Pr,Al phosphor in contact with a diffusing agent including at least one type of the elements, Be, Mg, Ca, Sr, and Ba. In the re-firing process, an amount of diffusing agent is added to include 0.001 to 15 weight % diffusing agent in the re-fired phosphor. The amount of diffusing agent added affects the light emission-characteristics of the phosphor. If too little diffusing agent is added, any effect of the diffusing agent to improve light emission characteristics cannot be expected. On the other hand, if too much diffusing agent is added, luminance will drop. Turning to FIG. 2, luminance and luminance maintenance are shown as a function of Ca content, where Ca is diffused into phosphor particles as a diffusing agent. As shown in FIG. 2, luminance and luminance maintenance show improvement as the amount of diffusing agent increases. At a diffusing agent content of 0.1 weight %, luminance reaches a maximum. If the amount of diffusing agent is further increased, luminance gradually decreases.

Firing temperature during the re-firing process is, for example, 400° C. to 1400° C., preferably, 500° C. to 1300° C., and more preferably, 800° C. to 1250° C. If temperature during the re-firing process is too low, diffusing agent added to the phosphor for re-firing cannot diffuse sufficiently into the interior of phosphor particles and little light emission characteristic improvement will be gained. In contrast, if temperature during the re-firing process is too high, diffusing agent will diffuse well into phosphor particle interiors and the effect of improving light emission characteristics near particle surfaces will decrease.

Since the method of manufacture of the second phosphor material of the present invention diffuses at least one type of diffusing agent, Be, Mg, Ca, Sr, and Ba, into the surface region of phosphor material having the chemical formula $SrTiO_3$:Pr,Al, it has the feature that phosphor particle surface light emission characteristics can be improved. In particular, the $SrTiO_3$:Pr,Al phosphor of the present invention can be excited by a low accelerating voltage, low energy electron beam to emit red light, and its luminance and luminance maintenance can be improved.

Further, since the method of manufacture of the second phosphor material of the present invention comprises a first firing process to fire raw materials into $SrTiO_3$:Pr,Al phosphor, and a re-firing process to again fire the phosphor in contact with diffusing agent, it has the feature that diffusing agent can be diffused into phosphor particle surface regions by simple process steps allowing both luminance and lifetime characteristics to be improved in an ideal fashion.

Finally, the third electron beam phosphor material of the present invention is a phosphor with the chemical formula $SrTiO_3$:Pr,Al characterized by a Sr/Ti molar ratio of 0.88 to 0.99. By specifying the Sr/Ti molar ratio within this range, light emission non-uniformity can be effectively eliminated while minimizing luminance reduction.

FIG. 3 shows light emission non-uniformity as a function of Sr/Ti molar ratio, and FIG. 4 shows relative luminance as a function of Sr/Ti molar ratio. Here, light emission non-uniformity was measured as follows.

100 parts by weight of a mixture of phosphor (90%) and $In_2O_3$ conductive material (10%) were mixed with 90 parts by weight of vehicle containing 2% organic binder. Phosphor screens were fabricated by applying this mixture to a substrate using printing methods to make circular phosphor spots 25 μm thick and 5 mm in diameter. Electrons with an accelerating voltage of 12 V and current flow of 0.6 mA were directed at the phosphor screens for light emission to visibly observe non-uniformity. For each phosphor, five phosphor spots were made, and non-uniformity measurement was performed by recording "a non-uniformity" if non-uniform emission occurred at even one location at the measured spot. Non-uniformity generation rate was computed by dividing the number of non-uniform locations by the total number of measurements.

From these figures, it is clear that luminance drops at Sr/Ti molar ratios below 0.88. Further, light emission non-uniformity increases when Sr/Ti molar ratios are greater than 0.99. To further reduce luminance decrease, the Sr/Ti molar ratio is made 0.92 to 0.99.

The third phosphor material of the present invention is suitable for phosphor displays with electron beam accelerating voltages of 1000 V or less, or in display device which use field emission cathodes as sources of electrons. Further, since light emission non-uniformity is eliminated by a specified Sr/Ti molar ratio for the $SrTiO_3$:Pr,Al phosphor described above, it can be used without adding conductive material such as $In_2O_3$ to improve conduction.

In the chemical formula $SrTiO_3$:Pr,Al, the amount of activating agent, Pr, included is 0.0001 to 0.1 mole per mole of Sr. The amount of activating agent, Al, included is 0.001 to 1.0 mole per mole of Ti. Specification of activating agent content within these ranges is for the purpose of making phosphor luminance as great as possible, and activating agent content exceeding these ranges results in a drop in luminance.

The third SrTiO3:Pr,Al phosphor of the present invention has the feature that light emission non-uniformity can be drastically reduced while minimizing luminance drop by confining the Sr/Ti molar ratio to a specified range. In particular, by specifying the Sr/Ti molar ratio in the range 0.92 to 0.99, the phosphor material has the feature that light emission non-uniformity can be made extremely small while maintaining luminance within 10% below the luminance of a phosphor with a Sr/Ti molar ratio of 1.

The above and further objects and features of the invention will more fully be apparent from the following detailed description with accompanying drawings.

DETAILED DESCRIPTION OF THE INVENTION

Figure 1:
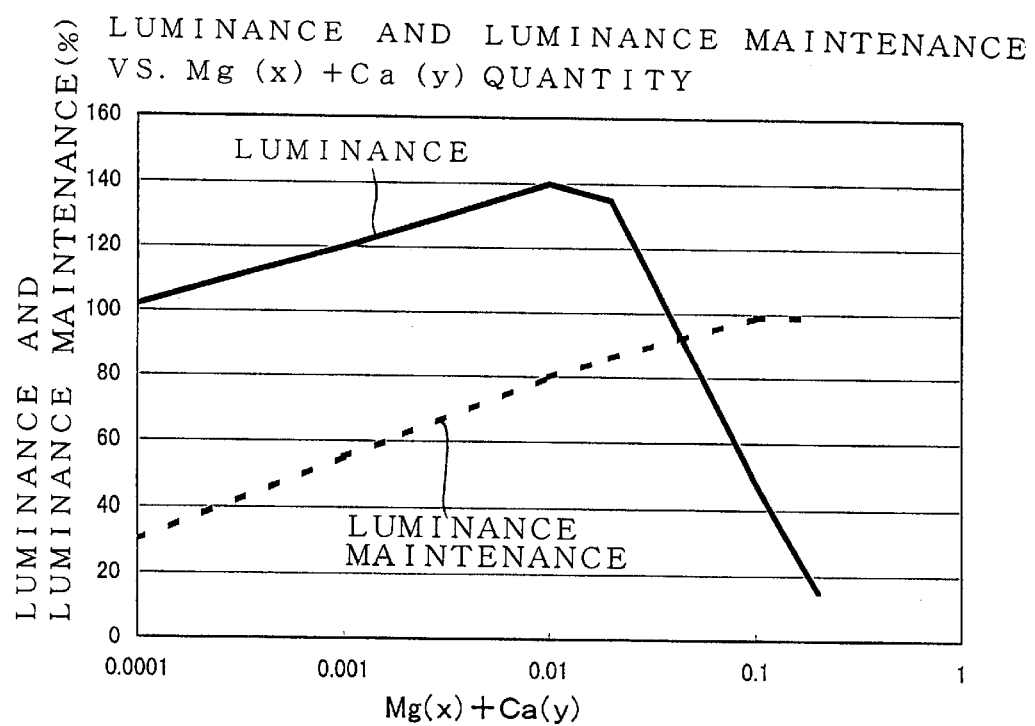
FIG. 1 is a graph showing relative luminance and luminance maintenance as a function of Mg and Ca quantity.
Figure 2:
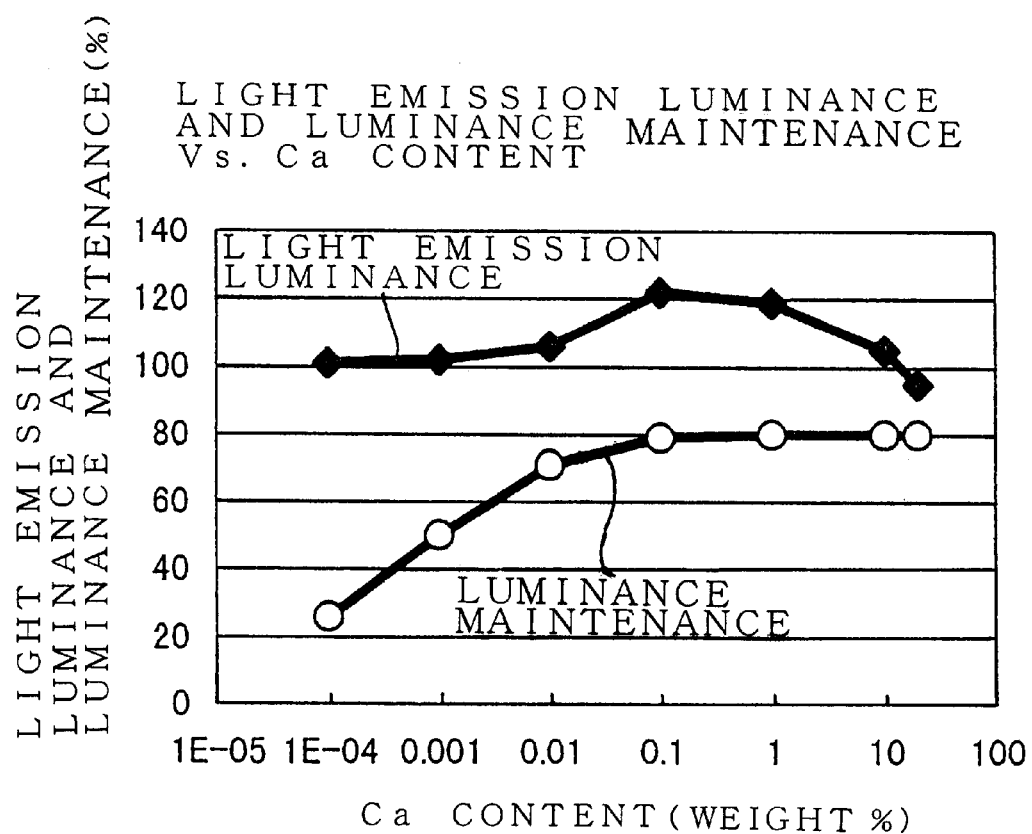
FIG. 2 is a graph showing relative luminance and luminance maintenance as a function of Ca content, where Ca is a diffusing agent diffused into phosphor particles.
Figure 3:
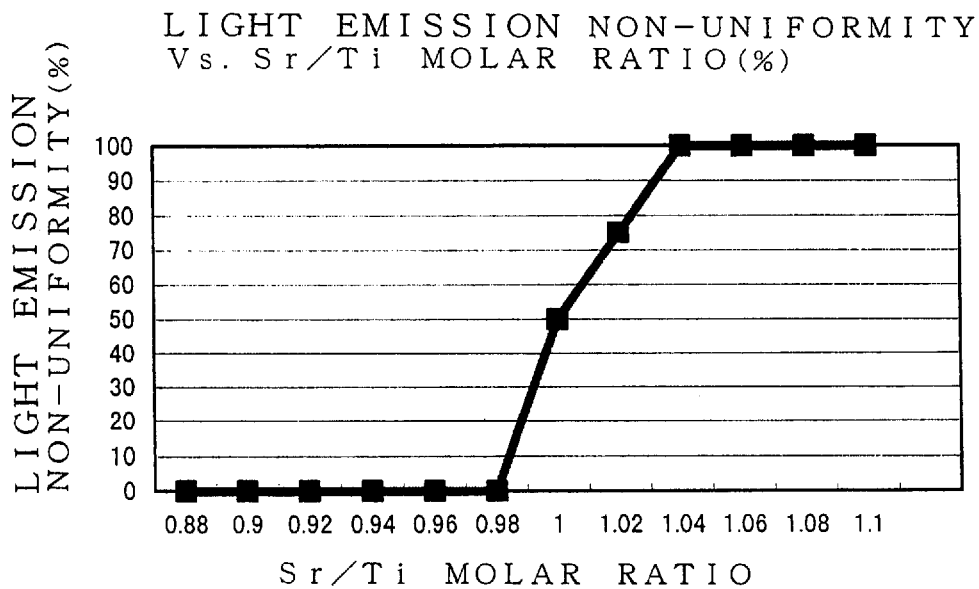
FIG. 3 is a graph showing light emission non-uniformity as a function of Sr/Ti molar ratio.
Figure 4:
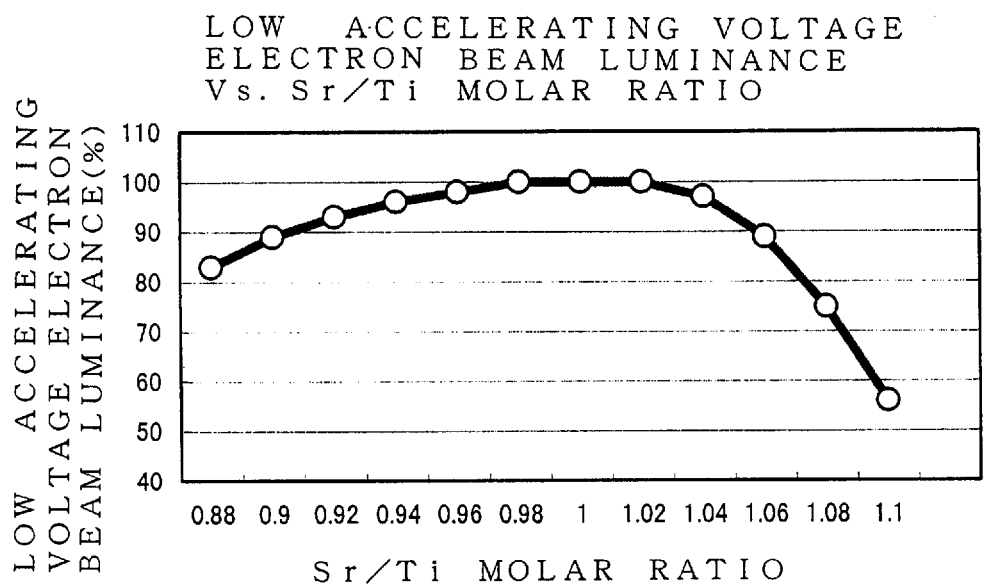
FIG. 4 is a graph showing relative luminance as a function of Sr/Ti molar ratio.

The first $(Sr_{1-x-y}, Mg_x, Ca_y)TiO_3$:Pr,Al phosphor material of the present invention is made by first measuring phosphor raw materials, mixing the powdered raw materials, inserting these raw materials into a circular cylindrical plastic pot, placing the plastic pot on rollers, and dry mixed via the rollers for 20 hours. After completion of mixing, the mixed raw materials are put in an alumina crucible and fired for 5 hours at 1250° C. in an atmospheric ambient in a muffle furnace.

$SrCO_3$, $MgCO_3$, $CaCO_3$, $TiO_2$, $Al(OH)_3$, and $Pr_6O_{11}$ powders are used as phosphor raw materials. The $(Sr_{1-x-y}, Mg_x, Ca_y)TiO_3$:Pr,Al phosphor of the present invention replaces part of the Sr with either or both Mg and Ca, and the amount of replacement Mg and Ca is an extremely small specified amount. The limited amount of replacement Mg and Ca is determined by specifying the amount of $MgCO_3$ and $CaCO_3$ mixed as raw materials. In the formula $(Sr_{1-x-y}, Mg_x, Ca_y)TiO_3$:Pr,Al, the value of x+y is, for example, 0.001 to 0.05, and more preferably, 0.003 to 0.02 for obtaining exceptional luminance and lifetime characteristics. Consequently, $MgCO_3$ and $CaCO_3$ are measured to put the value of x+y in the range specified above.

[First Embodiment]

The following powders were measured as phosphor raw materials.

| | |
|---|---|
| strontium carbonate | 254.8 g |
| magnesium carbonate | 0 g |
| calcium carbonate | 3.53 g |
| titanium dioxide | 145.0 g |
| aluminum hydroxide | 27.47 g |
| praseodymium oxide | 0.75 g |

These measured phosphor raw materials were put in a 2 liter plastic pot and dry mixed via rollers for 20 hours. After mixing, the resulting combination of raw materials were put in an alumina crucible and fired in a muffle furnace for 5 hours at 1250° C. in an atmospheric ambient. The fired phosphor was passed through a 200 mesh Dacron filter to obtain the phosphor material of the present invention.

The composition of the phosphor produced for this embodiment is $(Sr_{0.980}, Ca_{0.020})TiO_3$:Pr,Al. 100 parts by weight of a mixture of the resulting phosphor (90%) and $In_2O_3$ conductive material (10%) were mixed with 90 parts by weight of vehicle containing 2% organic binder. A Phosphor screen was fabricated by applying this mixture to a substrate using printing methods to make circular phosphor spots 25 µm thick and 5 mm in diameter. Electrons with an accelerating voltage of 12 V and current flow of 0.6 mA were directed at the phosphor screen, which emitted red light with a luminance of 138% and a luminance maintenance after 200 hrs of operation of 85%. Thus remarkable improvement in both luminance and luminance maintenance, or lifetime characteristics, could be shown.

Here, the luminance of a $SrTiO_3$:Pr,Al phosphor excited by a 12 V low energy electron beam is taken as 100%. In addition, luminance maintenance is the ratio of the reduced luminance after 200 hrs of operation to the initial luminance taken to be 100%.

[Second Embodiment]

The following powders were measured as phosphor raw materials.

| | |
|---|---|
| strontium carbonate | 254.8 g |
| magnesium carbonate | 1.48 g |
| calcium carbonate | 1.76 g |
| titanium dioxide | 145.0 g |
| aluminum hydroxide | 27.47 g |
| praseodymium oxide | 0.75 g |

The measured phosphor raw materials were processed in the same manner as the first embodiment to obtain the phosphor material of the second embodiment. The composition of the phosphor produced for this embodiment is $(Sr_{0.980}, Mg_{0.010}, Ca_{0.010})TiO_3$:Pr,Al. This phosphor emitted red light when excited by a 12 V low energy electron beam, and had a luminance of 137% and a luminance maintenance after 200 hrs of operation of 85%. Thus remarkable improvement in both luminance and luminance maintenance, or lifetime characteristics, could be shown.

[Third Embodiment]

The following powders were measured as phosphor raw materials.

| | |
|---|---|
| strontium carbonate | 257.4 g |
| magnesium carbonate | 0 g |
| calcium carbonate | 1.76 g |
| titanium dioxide | 145.0 g |
| aluminum hydroxide | 27.47 g |
| praseodymium oxide | 0.75 g |

The measured phosphor raw materials were processed in the same manner as the first embodiment to obtain the phosphor material of the third embodiment. The composition of the phosphor produced for this embodiment is $(Sr_{0.990}, Ca_{0.010})TiO_3:Pr,Al$. This phosphor emitted red light when excited by a 12 V low energy electron beam, and had a luminance of 139% and a luminance maintenance after 200 hrs of operation of 80%. Thus remarkable improvement in both luminance and luminance maintenance, or lifetime characteristics, could be shown.

[Fourth Embodiment]

The following powders were measured as phosphor raw materials.

| | |
|---|---|
| strontium carbonate | 259.4 g |
| magnesium carbonate | 0 g |
| calcium carbonate | 8.90 g |
| titanium dioxide | 145.0 g |
| aluminum hydroxide | 27.47 g |
| praseodymium oxide | 0.75 g |

The measured phosphor raw materials were processed in the same manner as the first embodiment to obtain the phosphor material of the fourth embodiment. The composition of the phosphor produced for this embodiment is $(Sr_{0.950}, Ca_{0.050})TiO_3:Pr,Al$. This phosphor emitted red light when excited by a 12 V low energy electron beam, and had a luminance of 85% and a luminance maintenance after 200 hrs of operation of 94%. Thus, although luminance was somewhat reduced, dramatic improvement in luminance maintenance, or lifetime characteristics, could be shown.

[Fifth Embodiment]

The following powders were measured as phosphor raw materials.

| | |
|---|---|
| strontium carbonate | 258.7 g |
| magnesium carbonate | 0.74 g |
| calcium carbonate | 0 g |
| titanium dioxide | 145.0 g |
| aluminum hydroxide | 27.47 g |
| praseodymium oxide | 0.75 g |

The measured phosphor raw materials were processed in the same manner as the first embodiment to obtain the phosphor material of the fifth embodiment. The composition of the phosphor produced for this embodiment is $(Sr_{0.995}, Mg_{0.005})TiO_3:Pr,Al$. This phosphor emitted red light when excited by a 12 V low energy electron beam, and had a luminance of 133% and a luminance maintenance after 200 hrs of operation of 72%. Thus remarkable improvement in both luminance and luminance maintenance, or lifetime characteristics, could be shown.

[Sixth Embodiment]

The following powders were measured as phosphor raw materials.

| | |
|---|---|
| strontium carbonate | 257.4 g |
| magnesium carbonate | 0.74 g |
| calcium carbonate | 0.88 g |
| titanium dioxide | 145.0 g |
| aluminum hydroxide | 27.47 g |
| praseodymium oxide | 0.75 g |

The measured phosphor raw materials were processed in the same manner as the first embodiment to obtain the phosphor material of the sixth embodiment. The composition of the phosphor produced for this embodiment is $(Sr_{0.990}, Mg_{0.005}, Ca_{0.005})TiO_3:Pr,Al$. This phosphor emitted red light when excited by a 12 V low energy electron beam, and had a luminance of 138% and a luminance maintenance after 200 hrs of operation of 81%. Thus remarkable improvement in both luminance and luminance maintenance, or lifetime characteristics, could be shown.

[First Comparison Example]

The following powders were measured as phosphor raw materials.

| | |
|---|---|
| strontium carbonate | 260.0 g |
| magnesium carbonate | 0 g |
| calcium carbonate | 0 g |
| titanium dioxide | 145.0 g |
| aluminum hydroxide | 27.47 g |
| praseodymium oxide | 0.75 g |

The measured phosphor raw materials were processed in the same manner as the first embodiment to obtain the phosphor material of the first comparison example. The composition of the phosphor produced for this first comparison example is $SrTiO_3:Pr,Al$. The luminance of this phosphor when excited by a 12 V low energy electron beam was taken to be 100%. Luminance maintenance after 200 hrs of operation was 25% showing extremely poor lifetime characteristics compared to phosphor material of the present invention.

In the phosphors above, Pr and Al are employed as activating agents, but part of the Al may also be replaced by either or both of the elements In and Ga.

The second $SrTiO_3:Pr,Al$ phosphor material of the present invention is made by a first firing process step and a re-firing process step. For the first firing process step, phosphor raw materials are measured and the powdered raw materials are mixed. These raw materials are put in a circular cylindrical plastic pot, the plastic pot is placed on rollers, and dry mixed via the rollers for 20 hours. After completion of mixing, the mixed raw materials are put in an alumina crucible for the first firing in an atmospheric ambient in a muffle furnace to produce the $SrTiO_3:Pr,Al$ phosphor. The firing temperature during the first firing process is 1000° C. to 1300° C., preferably 1200° C. to 1300° C., and optimally 1250° C. Firing time is, for example, 2 to 10 hours, preferably 3 to 7 hours, and optimally 5 hours.

$SrCO_3$, $TiO_2$, $Al(OH)_3$, and $Pr_6O_{11}$ powders are used as phosphor raw materials. The phosphor produced with these raw materials has the composition $SrTiO_3:Pr,Al$. In the phosphors of the present invention, compounds of magnesium and calcium such as $MgCO_3$ and $CaCO_3$, may also be added to replace part of the Sr with Mg and Ca. These phosphors have the composition (Sr, Mg, Ca)TiO$_3$:Pr,Al. The present invention concerns SrTiO$_3$:Pr,Al phosphors, but includes phosphors having part of the Sr replaced by other elements, and further includes phosphors replacing part of the activating agents by other elements.

In the replacement of an activating agent with another element, part of the Al is replaced by In or Ga. A phosphor which replaces part of the Sr with either or both Mg and Ca can improve luminance and lifetime characteristics with a specific amount of replacement Mg and Ca. The amount of replacement Mg and Ca can be determined by specifying the amount of MgCO$_3$ and CaCO$_3$ mixed as raw materials. Phosphors made in this fashion are described by the formula $(S_{1-x-y}, Mg_x, Ca_y)TiO_3$:Pr,Al, and the value of x+y is, for example, 0.001 to 0.05. More preferably, exceptional luminance and lifetime characteristics can be obtained for x+y values of 0.003 to 0.02. Measured amounts of MgCO$_3$ and CaCO$_3$ are added and mixed with the raw materials to put the value of x+y in this specified range.

Next, the SrTiO$_3$:Pr,Al phosphor made as described above is re-fired in contact with at least one of the diffusing agents, Be, Mg, Ca, Sr, and Ba in the re-firing process step. Preferably, the diffusing agent is attached to phosphor particle surfaces as a coating. However, re-firing can also be performed with micro-particles of diffusing agent attached to phosphor particle surfaces. Diffusing agents, such as the elements Be, Mg, Ca, Sr, and Ba, are attached to phosphor particle surfaces in the form of carbonate, oxide, and hydroxide salts.

Diffusing agent can be coated onto phosphor particle surfaces by the following method.
(1) Be, Mg, Ca, Sr, Ba, etc. are made into an aqueous nitrate, sulfate, or carbonate solution.
(2) Phosphor particles are added and mixed into the aqueous solution of dissolved diffusing agent.
(3) When sodium hydroxide is added to the mixed aqueous solution to adjust the pH, diffusing agent deposits on phosphor particle surfaces in hydroxide form.

A thin film coating of diffusing agent can be deposited over the entire surface of phosphor particles by the method above. When diffusing agent coated phosphor particles are re-fired during the re-firing process step, diffusing agent can be diffused uniformly into the entire surface of phosphor particles.

[Seventh Embodiment]
(1) Raw Material Adjustment Step
The following powders were measured as phosphor raw materials.

| | |
|---|---|
| strontium carbonate | 260.0 g |
| titanium dioxide | 145.0 g |
| aluminum hydroxide | 27.47 g |
| praseodymium oxide | 0.75 g |

These measured phosphor raw materials were put in a 2 liter plastic pot and dry mixed via rollers for 20 hours.
(2) First Firing Process Step
The mixed raw materials were put in an alumina crucible and fired for 5 hours at 1250° C. in an atmospheric ambient in a muffle furnace. The fired phosphor was passed through a 200 mesh Dacron filter to obtain SrTiO$_3$:Pr,Al phosphor. This phosphor was used as the second comparison example.
(3) Diffusing Agent Attachment Step
0.5 liters of an aqueous solution of calcium nitrate having a 0.012% Ca concentration was put in a 1 liter vessel, and 200 g of phosphor material was added and mixed. When NaOH was dripped into the aqueous solution of calcium nitrate to adjust the pH to 12.5, Ca(OH)$_2$ deposited onto phosphor particle surfaces. The deposited Ca(OH)$_2$ provided a coating on phosphor particle surfaces. In this process step, 0.11 g of Ca(OH)$_2$ surface coating was provided on 200 g of phosphor material.
(4) Re-Firing Process Step
Phosphor material coated with diffusing agent was put in an alumina crucible. The alumina crucible was put in a muffle furnace and re-fired at 1200° C. in an atmospheric ambient for 2 hours. The fired phosphor was passed through a 200 mesh Dacron filter. In this process step, SrTiO$_3$:Pr,Al phosphor with Ca diffusing agent diffused into phosphor particle surfaces was produced.

Chemical analysis of the SrTiO$_3$:Pr,Al phosphor of the seventh embodiment produced by these process steps showed Ca inclusion at 0.03 weight %. Further, this phosphor of the seventh embodiment had Ca diffused to a depth of 200 Å from the surface of phosphor particles. The diffusion depth of Ca into phosphor particles was measured from the surface of particles of phosphor crystal by Auger electron spectroscopy (AES) after sputtering.

Further, 100 parts by weight of a mixture of this phosphor (90%) and In$_2$O$_3$ conductive material (10%) were mixed with 90 parts by weight of vehicle containing 2% organic binder. A Phosphor screen was fabricated by applying this mixture to a substrate using printing methods to make circular phosphor spots 25 μm thick and 5 mm in diameter. Electrons with an accelerating voltage of 12 V and current flow of 0.6 mA were directed at the phosphor screen, which emitted red light with a luminance of 110% and a luminance maintenance after 500 hrs of operation of 72%. Thus remarkable improvement in both luminance and luminance maintenance, or lifetime characteristics, could be shown.

Luminance of a phosphor without diffusing agent, namely SrTiO$_3$:Pr,Al phosphor which was not re-fired, excited by a 12 V low energy electron beam was taken as a luminance of 100%. In addition, luminance maintenance is the ratio of the reduced luminance after 500 hrs of operation to the initial luminance taken to be 100%. Luminance maintenance for the second comparison example was 26%.

In the method above, phosphor particle surfaces were coated with Ca(OH)$_2$ diffusing agent and re-fired. However, the present invention does not necessarily require coating phosphor particles with diffusing agent, and diffusing agent may also be attached to phosphor particle surfaces as follows. Diffusing agent such as calcium hydroxide can be added in powdered form to SrTiO$_3$:Pr,Al phosphor obtained from the first firing process. This mixture can be put in a 2 liter plastic pot and dry mixed via rollers to attach diffusing agent to phosphor particle surfaces.

[Eighth Embodiment]
Other than replacement of the seventh embodiment diffusing agent attachment step (3) and re-firing process step (4) by the steps below, the phosphor material of the eighth embodiment was produced in the same manner as the phosphor of the seventh embodiment.
(3) Diffusing Agent Attachment Step
200 g of SrTiO$_3$:Pr,Al phosphor obtained from the first firing process of the seventh embodiment and 6.94 g of magnesium carbonate powder diffusing agent were put in a circular cylindrical plastic pot. The plastic pot was placed between two rollers and rotated via the rollers to dry mix the phosphor material and diffusing agent and attach diffusing agent to phosphor particle surfaces.
(4) Re-Firing Process Step
Phosphor material with diffusing agent attached to particle surfaces was put in an alumina crucible. The alumina crucible was put in a muffle furnace and re-fired at 1000° C. in an atmospheric ambient for 2 hours. The fired phosphor was passed through a 200 mesh Dacron filter. In this process step, $SrTiO_3$:Pr,Al phosphor with Mg diffusing agent diffused into phosphor particle surfaces was produced.

Chemical analysis of the $SrTiO_3$:Pr,Al phosphor of the eighth embodiment produced by these process steps showed Mg inclusion at 1.0 weight %. Further, this phosphor of the eighth embodiment had Mg diffused to a depth of 300 Å from the surface of phosphor particles. The diffusion depth of Mg into phosphor particles was measured from the surface of particles of phosphor crystal by AES after sputtering.

When excited by a 12 V low energy electron beam, this phosphor emitted red light with a luminance of 106% and a luminance maintenance after 500 hrs of operation of 74%. Thus remarkable improvement in both luminance and luminance maintenance could be shown.

[Ninth Embodiment]

Other than replacement of the seventh embodiment diffusing agent attachment step (3) and re-firing process step (4) by the steps below, the phosphor material of the ninth embodiment was produced in the same manner as the phosphor of the seventh embodiment.

(3) Diffusing Agent Attachment Step 200 g of $SrTiO_3$:Pr,Al phosphor obtained from the first firing process of the seventh embodiment and 0.18 g of barium oxide powder diffusing agent were put in a circular cylindrical plastic pot. The plastic pot was placed between two rollers and rotated via the rollers to dry mix the phosphor material and diffusing agent and attach diffusing agent to phosphor particle surfaces.

(4) Re-Firing Process Step

Phosphor material with diffusing agent attached to particle surfaces was put in an alumina crucible. The alumina crucible was put in a muffle furnace and re-fired at 1200° C. in an atmospheric ambient for 2 hours. The fired phosphor was passed through a 200 mesh Dacron filter. In this process step, $SrTiO_3$:Pr,Al phosphor with Ba diffusing agent diffused into phosphor particle surfaces was produced.

Chemical analysis of the $SrTiO_3$:Pr,Al phosphor of the ninth embodiment produced by these process steps showed Ba inclusion at 0.08 weight %. Further, this phosphor of the ninth embodiment had Ba diffused to a depth of 50 Å from the surface of phosphor particles. The diffusion depth of Ba into phosphor particles was measured from the surface of particles of phosphor crystal by AES after sputtering.

When excited by a 12 V low energy electron beam, this phosphor emitted red light with a luminance of 105% and a luminance maintenance after 500 hrs of operation of 60%. Thus remarkable improvement in both luminance and luminance maintenance could be shown.

[Tenth Embodiment]

Other than replacement of the seventh embodiment diffusing agent attachment step (3) and re-firing process step (4) by the steps below, the phosphor material of the tenth embodiment was produced in the same manner as the phosphor of the seventh embodiment.

(3) Diffusing Agent Attachment Step 200 g of $SrTiO_3$:Pr,Al phosphor obtained from the first firing process of the seventh embodiment and 0.56 g of beryllium oxide powder diffusing agent were put in a circular cylindrical plastic pot. The plastic pot was placed between two rollers and rotated via the rollers to dry mix the phosphor material and diffusing agent and attach diffusing agent to phosphor particle surfaces.

(4) Re-Firing Process Step

Phosphor material with diffusing agent attached to particle surfaces was put in an alumina crucible. The alumina crucible was put in a muffle furnace and re-fired at 1100° C. in an atmospheric ambient for 3 hours. The fired phosphor was passed through a 200 mesh Dacron filter. In this process step, $SrTiO_3$:Pr,Al phosphor with Be diffusing agent diffused into phosphor particle surfaces was produced.

Chemical analysis of the $SrTiO_3$:Pr,Al phosphor of the tenth embodiment produced by these process steps showed Be inclusion at 0.2 weight %. Further, this phosphor of the tenth embodiment had Be diffused to a depth of 350 Å from the surface of phosphor particles. The diffusion depth of Be into phosphor particles was measured from the surface of particles of phosphor crystal by AES after sputtering.

When excited by a 12 V low energy electron beam, this phosphor emitted red light with a luminance of 105% and a luminance maintenance after 500 hrs of operation of 55%. Thus luminance no better or worse than phosphor material with no diffusing agent, and remarkable improvement in luminance maintenance could be shown.

[Eleventh Embodiment]

Other than replacement of the seventh embodiment diffusing agent attachment step (3) and re-firing process step (4) by the steps below, the phosphor material of the eleventh embodiment was produced in the same manner as the phosphor of the seventh embodiment.

(3) Diffusing Agent Attachment Step 0.5 liters of an aqueous solution of strontium nitrate having a 0.04% Sr concentration was put in a 1 liter vessel, and 200 g of phosphor material was added and mixed. When NaOH was dripped into the aqueous solution of strontium nitrate to adjust the pH to 12.5, $Sr(OH)_2$ deposited onto phosphor particle surfaces. The deposited $Sr(OH)_2$ provided a coating on phosphor particle surfaces. In this process step, 0.28 g of $Sr(OH)_2$ surface coating was provided on 200 g of phosphor material.

(4) Re-Firing Process Step

Phosphor material coated with diffusing agent was put in an alumina crucible. The alumina crucible was put in a muffle furnace and re-fired at 1200° C. in an atmospheric ambient for 3 hours. The fired phosphor was passed through a 200 mesh Dacron filter. In this process step, $SrTiO_3$:Pr,Al phosphor with Sr diffusing agent diffused into phosphor particle surfaces was produced.

Chemical analysis of the $SrTiO_3$:Pr,Al phosphor of the eleventh embodiment produced by these process steps showed Sr inclusion at 44.5 weight %. Since Sr is included in the parent phosphor, Sr diffused into phosphor particle surfaces cannot be discriminated by chemical analysis from Sr in the parent phosphor. The Sr/Ti molar ratio was measured at 1.25 by AES indicating an abundance of Sr and inferring Sr diffusion into phosphor particle surface regions.

When excited by a 12 V low energy electron beam, this phosphor emitted red light with a luminance of 115% and a luminance maintenance after 500 hrs of operation of 71%. Thus remarkable improvement in both luminance and luminance maintenance, or lifetime characteristics, could be shown.

[Twelfth Embodiment]

Other than changing the amount of calcium hydroxide coating on phosphor particles from 0.1 g to 0.04 g in the seventh embodiment diffusing agent attachment step (3), the phosphor material of the twelfth embodiment was produced in the same manner as the phosphor of the seventh embodiment.

Chemical analysis of the $SrTiO_3$:Pr,Al phosphor of the twelfth embodiment produced by these process steps showed Ca inclusion at 0.011 weight %. Further, this phosphor of the twelfth embodiment had Ca diffused to a depth of 150 Å from the surface of phosphor particles. The diffusion depth of Ca into phosphor particles was measured from the surface of particles of phosphor crystal by Auger electron spectroscopy (AES) after sputtering.

When excited by a 12 V low energy electron beam, this phosphor emitted red light with a luminance of 106% and a luminance maintenance after 500 hrs of operation of 71%. Thus remarkable improvement in both luminance and luminance maintenance, or lifetime characteristics, could be shown.

[Thirteenth Embodiment]

Other than changing the amount of calcium hydroxide coating on phosphor particles from 0.11 g to 60.0 g in the seventh embodiment diffusing agent attachment step (3), the phosphor material of the thirteenth embodiment was produced in the same manner as the phosphor of the seventh embodiment.

Chemical analysis of the $SrTiO_3$:Pr,Al phosphor of the thirteenth embodiment produced by these process steps showed Ca inclusion at 15 weight %. Further, this phosphor of the thirteenth embodiment had Ca diffused to a depth of 250 Å from the surface of phosphor particles. The diffusion depth of Ca into phosphor particles was measured from the surface of particles of phosphor crystal by Auger electron spectroscopy (AES) after sputtering.

When excited by a 12 V low energy electron beam, this phosphor emitted red light with a luminance of 100% and a luminance maintenance after 500 hrs of operation of 80%. Thus luminance equal to phosphor material with no diffusing agent, and remarkable improvement in luminance maintenance could be shown.

The third $SrTiO_3$:Pr,Al phosphor material of the present invention is made by measuring and mixing powdered raw materials, putting these in a circular cylindrical plastic pot, placing the plastic pot on rollers, and dry mixing via the rollers for 20 hours. After completion of mixing, the mixed raw materials are put in an alumina crucible and fired in an atmospheric ambient in a muffle furnace at 1250° C. for 5 hours.

$SrCO_3$, $TiO_2$, $Al(OH)_3$, and $Pr_6O_{11}$ powders are used as phosphor raw materials. The $SrTiO_3$:Pr,Al phosphor material of this invention has a specific Sr/Ti molar ratio and that molar ratio is determined by a specific molar ratio for the $SrCO_3$ and $TiO_2$ mixed as raw materials. Since $SrTiO_3$:Pr,Al phosphor demonstrates desirable luminance characteristics for a Sr/Ti molar ratio of 0.88 to 0.99, the $SrCO3/TiO_2$ molar ratio is set in that range.

[Fourteenth Embodiment]

The following powders were measured as phosphor raw materials.

| | |
|---|---|
| strontium carbonate | 260.0 g |
| titanium dioxide | 142.2 g |
| aluminum hydroxide | 27.47 g |
| praseodymium oxide | 0.75 g |

These measured phosphor raw materials were put in a 2 liter plastic pot and dry mixed via rollers for 20 hours. After mixing, the resulting combination of raw materials were put in an alumina crucible and fired in a muffle furnace for 5 hours at 1250° C. in an atmospheric ambient. The fired phosphor was passed through a 200 mesh Dacron filter to obtain the phosphor material of the present invention.

The chemical composition of the phosphor produced in this embodiment showed a Sr/Ti molar ratio of 0.99, and the amounts of Al and Pr included were 20 molar % and 0.25 molar % respectively. This phosphor emitted red light, showed no emission non-uniformity, and had luminance equivalent to phosphors with Sr/Ti molar ratios of 1.

[Fifteenth Through Nineteenth Embodiments]

$SrTiO_3$:Pr,Al phosphors were produced in the same manner as the fourteenth embodiment except that phosphor raw materials were as shown in Table 1. Resulting chemical compositions for the phosphor of each embodiment are shown in Table 2, and phosphor emission characteristics, specifically emission non-uniformity and luminance, are shown in Table 3.

TABLE 1

Embodiment and comparison example chemical composition

| | 14th embod. | 15th embod. | 16th embod. | 17th embod. | 18th embod. | 19th embod. | 3rd compar. | 4th compar. |
|---|---|---|---|---|---|---|---|---|
| $SrCO_3$ | 260.0 g | 260.0 g | 260.0 g | 260.0 g | 260.0 g | 260.0 g | 260.0 g | 260.0 g |
| $TiO_2$ | 142.2 g | 143.6 g | 146.6 g | 149.7 g | 153.0 g | 156.4 g | 140.7 g | 136.6 g |
| $Al(OH)_3$ | 27.47 g | 27.47 g | 27.47 g | 27.47 g | 27.47 g | 27.47 g | 27.47 g | 27.47 g |
| $Pr_6O_{11}$ | 0.75 g | 0.75 g | 0.75 g | 0.75 g | 0.75 g | 0.75 g | 0.75 g | 0.75 g |

TABLE 2

Analysis results

| | 14th embod. | 15th embod. | 16th embod. | 17th embod. | 18th embod. | 19th embod. | 3rd compar. | 4th compar. |
|---|---|---|---|---|---|---|---|---|
| Sr/Ti molar ratio | 0.99 | 0.98 | 0.96 | 0.94 | 0.92 | 0.90 | 1.00 | 1.03 |
| Al (molar %) | 20 | 20 | 20 | 20 | 20 | 20 | 20 | 20 |
| Pr (molar %) | 0.25 | 0.25 | 0.25 | 0.25 | 0.25 | 0.25 | 0.25 | 0.25 |

TABLE 3

| | 14th embod. | 15th embod. | 16th embod. | 17th embod. | 18th embod. | 19th embod. | 3rd compar. | 4th compar. |
|---|---|---|---|---|---|---|---|---|
| Emission non-uniformity and luminance results | | | | | | | | |
| non-uniformity (%) | 25 | 0 | 0 | 0 | 0 | 0 | 50 | 100 |
| luminance (%) | 100 | 100 | 98 | 95 | 92 | 88 | 100 | 100 |

$SrTiO_3$:Pr,Al phosphors produced in these embodiments showed extremely little non-uniformity, and little luminance reduction. Compared to a Sr/Ti molar ratio of 1 phosphor (100% luminance), phosphors produced in these embodiments showed 88% to 100% luminance. In particular, phosphors with Sr/Ti molar ratios of 0.92 to 0.99 showed luminance of 92% to 100%, thereby having luminance characteristics comparable to a phosphor with a Sr/Ti molar ratio of 1.

[Third and Fourth Comparison Examples]

For comparison with the $SrTiO_3$:Pr,Al phosphors of the present invention, $SrTiO_3$:Pr,Al phosphors were produced in the same manner as the fourteenth embodiment except that phosphor raw materials were as shown in the "3rd compar." and "4th compar." columns of Table 1. Resulting chemical compositions for the phosphor of each comparison example are shown in Table 2, and phosphor emission characteristics, specifically emission non-uniformity and luminance, are shown in Table 3.

$SrTiO_3$:Pr,Al phosphors produced in the third and fourth comparison examples showed extremely high emission non-uniformity with emission non-uniformity of 50% to 100%.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims or equivalence of such meets and bounds thereof are therefore intended to be embraced by the claims.

What is claimed is:

1. Phosphor material which emits light with electron beam excitation having the chemical composition formula $(Sr_{1-x-y}, Mg_x, Ca_y)TiO_3$:Pr,Al, wherein x>0 and the value of x+y is in the range 0.001 to 0.05.

2. Phosphor material as recited in claim 1 wherein the value of x+y is in the range 0.003 to 0.02.

3. Phosphor material as recited in claim 1 wherein the amount of Pr activating agent included is 0.0001 to 0.1 mole for 1 mole of Sr.

4. Phosphor material as recited in claim 1 wherein the value of y is 0.

5. Phosphor material as recited in claim 1 wherein the amount of Al activating agent included is 0.001 to 1.0 mole for 1 mole of Ti.

6. Phosphor material as recited in claim 1 wherein the amount of Pr activating agent included is 0.0001 to 0.1 mole for 1 mole of Sr, and the amount of Al activating agent included is 0.001 to 1.0 mole for 1 mole of Ti.

7. Phosphor material as recited in claim 1 wherein part of the Al activating agent is replaced by at least one of the elements Ga and In.

8. A phosphorescent display device having an electron beam accelerating voltage of 1000 V or less, which comprises the phosphor material as recited in claim 1.

9. A display device employing a field emission cathode as electron source, which comprises the phosphor material as recited in claim 1.

10. Phosphor material for use with an electron beam having the chemical composition formula $SrTiO_3$:Pr,Al;
wherein diffusing agent including at least one of the elements Be, Mg, Ca, Sr, and Ba is diffused into phosphor particle surface regions.

11. Phosphor material for use with an electron beam as recited in claim 10 wherein the diffusion depth of diffusing agent into a phosphor particle interior from its surface is in the range of 50 λ to 400 λ.

12. Phosphor material for use with an electron beam as recited in claim 10 wherein the phosphor is re-fired with diffusing agent in contact with phosphor particle surfaces to diffuse diffusing agent into phosphor particle surface regions.

13. Phosphor material for use with an electron beam as recited in claim 10 wherein 0.001 to 15 weight % diffusing agent is included in the phosphor material.

14. Phosphor material for use with an electron beam as recited in claim 10 wherein the phosphor is re-fired at 400° C. to 1300° C. with diffusing agent in contact with phosphor particle surfaces to diffuse diffusing agent into phosphor particle surface regions.

15. A phosphorescent display device having an electron beam accelerating voltage of 1000 V or less, or a display device employing a field emission cathode as electron source, which comprises the phosphor material as recited in claim 10.

16. A method of phosphor material manufacture to produce $SrTiO_3$:Pr,Al phosphor material comprising:
a first firing process step to fire phosphor raw materials into $SrTiO_3$:Pr,Al phosphor; and
a re-firing process step to again fire the $SrTiO_3$:Pr,Al phosphor with diffusing agent, including at least one of the elements Be, Mg, Ca, Sr, and Ba, in contact with phosphor particle surfaces.

17. A method of phosphor material manufacture as recited in claim 16 wherein an amount of diffusing agent is added to the phosphor material for re-firing such that 0.001 to 15 weight % diffusing agent is included in the re-fired phosphor.

18. A method of phosphor material manufacture as recited in claim 16 wherein phosphor particle surfaces are covered with diffusing agent and re-fired.

19. A method of phosphor material manufacture as recited in claim 16 wherein the firing temperature during the re-firing process step is 400° C. to 1400° C.

20. Phosphor material which emits light with electron beam excitation having the chemical composition formula $SrTiO_3$:Pr,Al;
characterized by a Sr/Ti molar ratio of 0.88 to 0.99.

21. Phosphor material as recited in claim 20 wherein the Sr/Ti molar ratio is 0.92 to 0.99.

22. Phosphor material as recited in claim 20 wherein the amount of Pr activating agent included is 0.0001 to 0.1 mole for 1 mole of Sr.

23. Phosphor material as recited in claim 20 wherein the amount of Al activating agent included is 0.001 to 1.0 mole for 1 mole of Ti.

24. A display device employing a field emission cathode as electron source, which comprises the phosphor material as recited in claim 20.

25. A display device as recited in claim 24, which does not contain conductive material.

26. A phosphorescent display device having an electron beam accelerating voltage of 1000 V or less, which comprises the phosphor material as recited in claim 20.

27. A phosphorescent display device as recited in claim 26, which does not contain conductive material.

* * * * *